United States Patent [19]

Eberhard et al.

[11] Patent Number: 4,621,795
[45] Date of Patent: Nov. 11, 1986

[54] HYDRAULICALLY DAMPED RESILIENT MOUNTING

[75] Inventors: Günter Eberhard, Gehrden; Jürgen Heitzig; Werner Fischer, both of Hanover, all of Fed. Rep. of Germany

[73] Assignee: Continental Gummi-Werke Aktiengesellschaft, Hanover, Fed. Rep. of Germany

[21] Appl. No.: 707,089

[22] Filed: Mar. 1, 1985

[30] Foreign Application Priority Data

Mar. 1, 1984 [DE] Fed. Rep. of Germany ....... 3407553

[51] Int. Cl.⁴ ............................. F16F 9/10; F16F 9/34
[52] U.S. Cl. .................................. 267/8 R; 188/378; 248/562; 248/636; 267/140.1
[58] Field of Search .................. 267/8 R, 63 R, 63 A, 267/140.1, 153, 8 B, 8 C, 8 D, 8 A, 9 R, 9 B, 9 A, 9 C, 10; 188/378, 379, 380, 322.15; 248/562, 636; 403/50, 51; 180/312

[56] References Cited

U.S. PATENT DOCUMENTS 4,159,091 6/1979 Le Salver et al. ............... 267/140.1

FOREIGN PATENT DOCUMENTS 27751 4/1981 European Pat. Off. ......... 267/140.1
2041485 9/1980 United Kingdom ............. 267/140.1
2091841 8/1982 United Kingdom ........... 188/322.15

*Primary Examiner*—Duane A. Reger
*Assistant Examiner*—Richard R. Diefendorf
*Attorney, Agent, or Firm*—Becker & Becker, Inc.

[57] ABSTRACT

A hydraulically damped motor mount for motor vehicles, and similar elastic supports having a controlled damping device, the free cross-sectional flow of which is statically closed off by a flexible diaphragm which is held with a certain freedom of movement between rigid support plates. In order to improve the acoustical behavior of such mountings, and to suppress the noise associated with the change in direction of the spring movements, the inner peripheral region of the support plates which embrace the diaphragm, and which overlap the edge of the latter, is provided with successive indentations in the form of gaps between teeth in such a way that the frictional forces generated by the approach of the diaphragm onto the support plates in the damping fluid is kept low. The inventive configuration of the support surfaces results in the elimination of undesirable tapping noises when the placement of the diaphragm has advanced partially.

6 Claims, 3 Drawing Figures

HYDRAULICALLY DAMPED RESILIENT MOUNTING

BACKGROUND OF THE INVENTION

1. Field of the Invention

The present invention relates to a hydraulically damped, resilient mounting or support, especially for the engine of a motor vehicle; the mounting has a housing, which is covered by elastomeric spring elements, and is divided by a rigid partition into two chambers; these chambers are filled with a damping fluid, and can alternately change their volume; the partition is provided with a flexible diaphragm which is axially movable to a limited extent in an opening of the partition; the diaphragm defines a narrow by-pass for the damping fluid.

2. Description of the Prior Art

The slight freedom of movement of the diaphragm in such mountings is generally only a few tenths of a millimeter, and results in a relatively wide by-pass initially being available during the spring movement between the two partial chambers for the pressure equalization, with a damping action starting only when the diaphragm rests against the partition. Under changing test conditions, and also in practical application, in certain frequency and amplitude ranges such mountings repeatedly exhibited the tendency to develop undesirable noise.

An object of the present invention is to improve the acoustical behavior of the mounting without adversely affecting the desired damping action.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
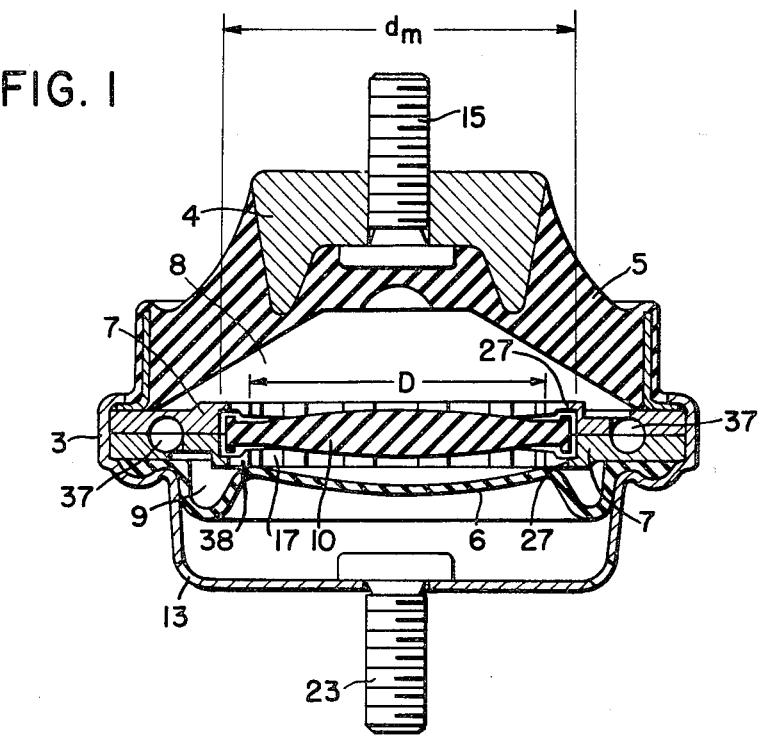
FIG. 1 is a schematic cross-sectional view of one inventive embodiment of a motor mount.

The mounting of the present invention is characterized primarily in that the inner edge of the opening in the partition is provided with indentations which are equidistantly spaced over its periphery; the indentations overlap the edge of the diaphragm.

The indentations can expediently be essentially in the form of segmental areas, for example semi-circular areas. Pursuant to a further specific embodiment of the present invention, it is desirable if the edge portions of the opening, which edge portions project radially inwardly between the indentations in a toothlike manner, are bent off on both sides in the direction toward the diaphragm.

The smallest passage area of the opening in the partition may be of an order of magnitude which corresponds to the effective area of the elastomeric spring element.

With the inventive configuration of the damping device, it is possible to practically completely suppress the heretofore unavoidably resulting noises of the oscillating mounting, even in the critical ranges. This advantageous effect is attributed to the improvements in the flow in the edge region of the diaphragm. The inventive approach is based on the recognition of the significance of the diaphragm contact surfaces in the peripheral zone of the partition opening, which peripheral zone is overlapped by the membrane contact surfaces; the significance being attributed hereto is noted in that this is the cause for the noise. The therefrom inferred assumption of a hardening or increase due to the alternating displacement of damping fluid under the effect of higher oscillation frequencies has been proved correct with practical embodiments of the inventive concept.

DESCRIPTION OF PREFERRED EMBODIMENTS

Referring now to the drawings in detail, the illustrated mounting or support is in two parts, including a cup-shaped housing 3, and a rubber spring element 5 which is in the shape of a truncated cone, covers the top of the housing 3, and is bonded to a connector 4. The lower portion of the housing 3 is provided with a plurality of vents 13, and the top of the housing 3 is closed off by a flexible diaphragm 6 which is sealingly secured in a flanged rim of the housing 3. With the aid of a bolt 23 which is securely inserted in the lower portion of the housing 3, the mounting can be secured to a non-illustrated part of the body of the vehicle; the connector 4 of the rubber spring element 5 serves for attachment to a similarly non-illustrated motor mount, and for this purpose is provided with a bolt 15. A partition 7 which is disposed in the rim of the housing 3 divides the interior of the housing between the spring element 5 and the diaphragm 6 into an upper chamber 8 and a lower chamber 9, both of which are completely filled with a damping fluid.

Figure 2:
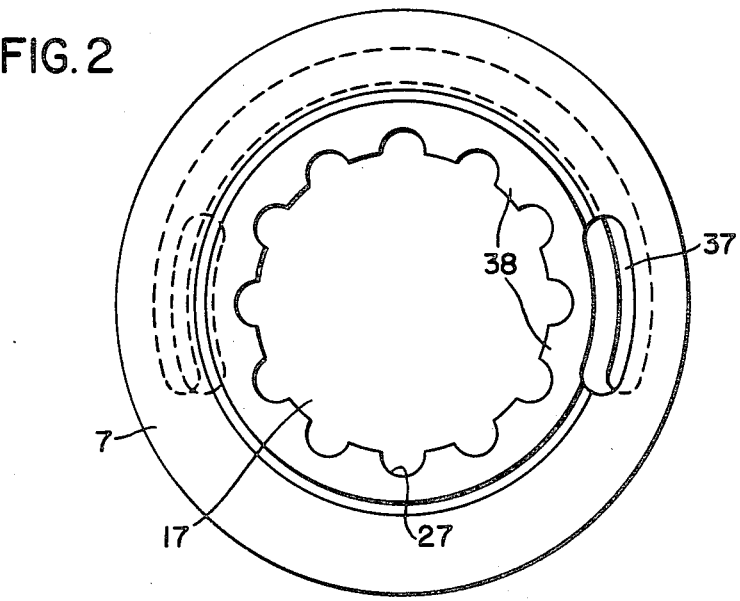
FIG. 2 is a detailed plan view of a portion of the motor mount shown in FIG. 1.

The partition 7 essentially comprises two identical metallic annular elements, which in the illustrated installed position have movably disposed between their inner edges, with slight axial play, a flexible diaphragm 10 which spans concentric opening 17. This support of the diaphragm 10 at the same time forms a narrow transfer passage or by-pass between the two chambers 8 and 9. This by-pass experiences a further constriction after the diaphragm 10 touches one of the annular elements of the partition 7 under the effect of a pressure differential after the unrestricted passage has been exhausted. Also provided along the same vein is a constantly open connection formed by a ring bore 37, which is formed in the circumferential direction into both of the annular elements of the partition 7, and which opens into the chambers 8 and 9. As shown in the plan view of FIG. 2, those edges of the annular elements of the partition 7 which are adjacent to the opening 17 are provided with an internal serration in the form of a succession of semi-circular indentations 27, so that the diaphragm 10 practically only contacts those edge portions 38 of the annular elements which project inwardly between respective adjacent indentations 27. As can be seen from the cross-sectional view of FIG. 1, the edge portions 38 on both sides of the combined partition 7 are bent at least partially in the direction toward the diaphragm.

The diameter D of the opening 17, which is measured between the projecting edge portions 38, is less than the average effective diameter $d_m$ of the rubber spring element 5. For the functional reliability of the novel damping device, it is particularly advantageous to have the ratio $D/d_m$ as large as possible, but at least greater than 0.5.

Figure 3:
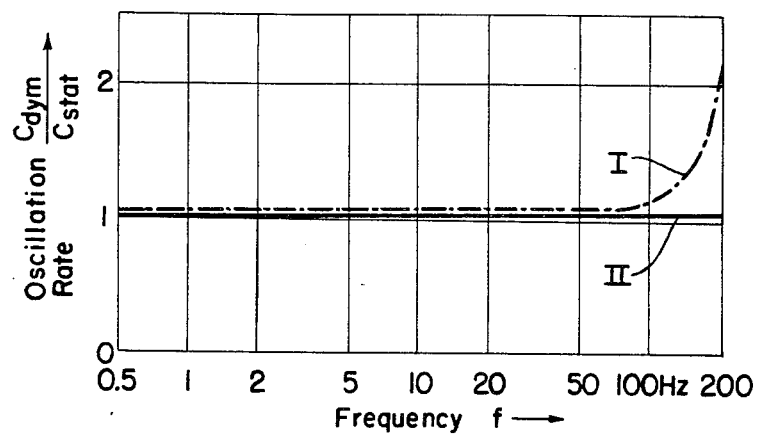
FIG. 3 is a graph comparing the oscillation rates of a conventional mounting and an inventive mounting plotted at different frequencies.

The advantages of the present invention are evident from the result of comparative measurements of the relative oscillation rates (c dyn/c stat) of both a conventional mounting and an inventive mounting. The bases for curves illustrated in FIG. 3 were measurements at an amplitude of approximately 0.1 mm over an oscillation range of f=0.5–200 Hz. The curve I which applies to the conventional mounting shows a distinct, undesirable rise starting at about 100 Hz, while the inventive mounting (curve II) exhibits no dynamic increase.

The present invention is, of course, in no way restricted to the specific disclosure of the specification and drawings, but also encompasses any modifications within the scope of the appended claims.

What we claim is:

1. A hydraulically damped, resilient mounting particularly for a drive motor of a motor vehicle and having a housing which is covered by elastomeric spring means having an effective area thereof determined by an effective diameter of said spring means, and which is divided by a rigid partition into two chambers; said chambers of said housing being filled with a damping fluid, and said chambers being adapted so that they can alternately have a change in their volume; said partition being provided with a flexible diaphragm which is axially movable to a limited extent in a central opening of said partition with a predetermined size of a smallest passage area of the opening correspondingly located as to the effective area of said spring means; said diaphragm defining a narrow by-pass between said chambers for said damping fluid; the improvement therewith wherein:

said partition has a radially inner edge which forms said opening thereof; said radially inner edge being provided with indentations which overlap a radially outer bead edge of said diaphragm, and which are distributed equidistantly over the periphery of said inner edge of said opening.

2. A mounting according to claim 1, in which each of said indentations has an essentially segmental shape.

3. A mounting according to claim 2, in which each of said indentations has an essentially semicircular shape.

4. A mounting according to claim 2, in which said radially inner edge of said partition about said opening thereof is provided with respective edge portions between respective ones of said indentations; said edge portions being provided on each side of said diaphragm, and extendingly radially inwardly, so that a tooth-like configuration of alternating edge portions and indentations is formed; the radially inner portions of said edge portions being bent toward said diaphragm.

5. A mounting according to claim 4, in which the size of the smallest passage area of said opening in said partition corresponds approximately to the effective area of said elastomeric spring means.

6. A mounting according to claim 4, in which the smallest diameter of said opening in said partition is at least 0.5 times the average diameter of said elastomeric spring means.

* * * * *